US008589407B2

(12) United States Patent
Bhatia

(10) Patent No.: US 8,589,407 B2
(45) Date of Patent: Nov. 19, 2013

(54) AUTOMATED GENERATION OF SUGGESTIONS FOR PERSONALIZED REACTIONS IN A SOCIAL NETWORK

(75) Inventor: Ashish Bhatia, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/163,331

(22) Filed: Jun. 17, 2011

(65) Prior Publication Data

US 2012/0323928 A1    Dec. 20, 2012

(51) Int. Cl.
*G06F 17/30* (2006.01)
(52) U.S. Cl.
USPC ............ 707/748; 707/758; 709/203; 709/219
(58) Field of Classification Search
USPC ............. 707/723, 732, 767, 999.01, 999.003, 707/999.006, 999.007, 999.107, 748, 758; 709/203, 219
See application file for complete search history.

(56) References Cited

U.S. PATENT DOCUMENTS

| | | | |
|---|---|---|---|
| 6,029,195 A * | 2/2000 | Herz | 725/116 |
| 6,130,938 A | 10/2000 | Erb | |
| 6,192,119 B1 | 2/2001 | Wilson | |
| 6,697,478 B1 | 2/2004 | Meldrum et al. | |
| 6,718,368 B1 | 4/2004 | Ayyadurai | |
| 6,754,322 B1 | 6/2004 | Bushnell | |
| 7,106,848 B1 | 9/2006 | Barlow et al. | |
| 7,366,990 B2 | 4/2008 | Pitroda | |
| 7,555,110 B2 | 6/2009 | Dolan et al. | |
| 7,610,287 B1 | 10/2009 | Dean et al. | |
| 7,742,468 B2 | 6/2010 | Vagelos | |
| 7,756,806 B1 * | 7/2010 | Heidenreich et al. | 706/46 |
| 7,970,827 B1 * | 6/2011 | Cumberbatch et al. | 709/204 |
| 2002/0137490 A1 | 9/2002 | Gallant | |
| 2002/0143874 A1 | 10/2002 | Marquette et al. | |

(Continued)

FOREIGN PATENT DOCUMENTS

| | | |
|---|---|---|
| JP | 2002-049564 | 2/2002 |
| JP | 3716548 | 11/2005 |

(Continued)

OTHER PUBLICATIONS

Adamic et al., "A Social Network Caught in the Web," Internet Journal, First Monday, Jun. 2, 2003, vol. 8, No. 6, pp. 1-22.

(Continued)

*Primary Examiner* — Leslie Wong
(74) *Attorney, Agent, or Firm* — Patent Law Works LLP

(57) ABSTRACT

A system and method for automatic generating suggestions for personalized reactions or messages. A suggestion generation module includes a plurality of collector modules, a credentials module, a suggestion analyzer module, a user interface module and a decision tree. The plurality of collector modules are coupled to respective systems to collect information accessible by the user and important to the user from other systems such as e-mail systems, SMS/MMS systems, micro blogging systems, social networks or other systems. The information from these collector modules is provided to the suggestion analyzer module. The suggestion analyzer module cooperates with the user interface module and the decision tree to generate suggested reactions or messages for the user to send. The suggested reactions or messages are presented by the user interface module to the user. The user interface module also displays the original message, other information about the original message such as others' responses, and action buttons for sending, discarding or ignoring the suggested message.

21 Claims, 8 Drawing Sheets

(56) References Cited

U.S. PATENT DOCUMENTS

| | | | |
|---|---|---|---|
| 2004/0258220 A1 | 12/2004 | Levine et al. | |
| 2005/0152521 A1 | 7/2005 | Liljestrand | |
| 2005/0256866 A1* | 11/2005 | Lu et al. | 707/5 |
| 2006/0026288 A1 | 2/2006 | Acharya et al. | |
| 2006/0077957 A1 | 4/2006 | Reddy et al. | |
| 2006/0206604 A1 | 9/2006 | O'Neil et al. | |
| 2007/0005654 A1* | 1/2007 | Schachar et al. | 707/104.1 |
| 2007/0127631 A1 | 6/2007 | Difiglia | |
| 2007/0171898 A1 | 7/2007 | Salva | |
| 2007/0173236 A1 | 7/2007 | Vishwanathan et al. | |
| 2007/0248077 A1 | 10/2007 | Mahle, Jr. et al. | |
| 2008/0056475 A1 | 3/2008 | Brannick et al. | |
| 2008/0192656 A1 | 8/2008 | Vagelos | |
| 2009/0076795 A1 | 3/2009 | Bangalore et al. | |
| 2009/0319342 A1* | 12/2009 | Shilman et al. | 705/10 |
| 2010/0161619 A1* | 6/2010 | Lamere et al. | 707/749 |
| 2010/0198757 A1* | 8/2010 | Cheng et al. | 706/12 |
| 2010/0205541 A1* | 8/2010 | Rapaport et al. | 715/753 |
| 2010/0223341 A1* | 9/2010 | Manolescu et al. | 709/206 |
| 2010/0306249 A1* | 12/2010 | Hill et al. | 707/769 |
| 2011/0029636 A1* | 2/2011 | Smyth et al. | 709/217 |
| 2011/0072035 A1 | 3/2011 | Gaucas et al. | |
| 2011/0098156 A1 | 4/2011 | Ng et al. | |
| 2011/0191417 A1* | 8/2011 | Rathod | 709/204 |
| 2011/0208822 A1* | 8/2011 | Rathod | 709/206 |
| 2011/0252108 A1 | 10/2011 | Morris et al. | |
| 2011/0295903 A1* | 12/2011 | Chen | 707/794 |

FOREIGN PATENT DOCUMENTS

| | | |
|---|---|---|
| KR | 10-2005-0067121 | 6/2006 |
| WO | WO02079984 | 10/2002 |
| WO | WO2011/134833 | 11/2011 |

OTHER PUBLICATIONS

Agarwal et al., "Enabling Real-Time User Interests for Next Generation Activity-Oriented Social Networks," Thesis submitted to the Indian Institue of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always On" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom, pp. 252-255.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

O'Murchu et al., "Online Social and Business Networking Communities," Digital Enterprise Research Institute DERI Technical Report, National University of Ireland, Aug. 8, 2004, 22 pgs.

Ring Central, Inc., Internet, retrieved at http://www.ringcentral.com, Apr. 19, 2007, 1 pg.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twitter, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

International Search Report, International Application No. PCT/US2012/041702, Jun. 8, 2012, 12 pgs.

Heer et al., "Vizster: Visualizing Online Social Networks," University of California, Berkeley, Oct. 23, 2005, 8 pgs.

Singh et al., "CINEMA: Columbia InterNet Extensible Multimedia Architecture," Department of Computer Science, Columbia University, May 2002, pp. 1-83.

* cited by examiner

AUTOMATED GENERATION OF SUGGESTIONS FOR PERSONALIZED REACTIONS IN A SOCIAL NETWORK

BACKGROUND

The present disclosure relates to social networks and electronic communication. In particular, the present disclosure relates to a system and methods for generating suggestions for personalized reactions, replies or messages in social networks and professional systems.

The popularity and use of social networks and other types of electronic communication has grown dramatically in recent years. With the increased use and popularity of social networks, the value of these networks has increased exponentially. However, this also means that the number of messages and information each user must process has increased exponentially. It is often difficult for users to keep up with and reply to all the messages they are receiving. Therefore, it is important for user to keep to most critical message based on their interests and more importantly, based on how other users reacted to that message.

Many users use online social networking for both professional and personal uses. Each of these different types of use has its own unstated protocol for behavior. It is extremely important for the users to act in an adequate manner depending upon which social network on which they are operating. For example, it may be very important to say "congratulations" to a friend when that friend announces that she/he has gotten a new job. This is a particular problem as many users subscribe to many social different social networks. With an ever increasing online connectivity and growing list of online contacts and given the amount of information users put online, it is possible for a person to miss such an update.

Existing techniques do not adequately address the amount of information produced in social networks, the increased number of contacts, and the number items that require reply or messages. For example, some calendar programs allow the user to manually set reminders for special events such as birthdays or anniversaries. However, all that is produced is a reminder message about the event that the user input. There is no additional information or context. Furthermore, no message or reply is generated. Finally, such systems are not able to respond to dynamic events and can only handle events where the date and time are known beforehand.

SUMMARY

The present disclosure overcomes the deficiencies and limitations of the prior art at least in part by providing a system and method for generating suggestions for personalized reactions or messages. The system according to the present disclosure includes a suggestion generation module. In one embodiment, the suggestion generation module includes a plurality of collector modules, a credentials module, a suggestion analyzer module, a user interface module and a decision tree. The plurality of collector modules are coupled to respective systems to collect information accessible by the user and important to the user from other systems such as e-mail systems, SMS/MMS systems, micro blogging systems, social networks or other systems. The credentials module cooperates with the plurality of collector modules to allow access to those other systems. The information from these collector modules is provided to the suggestion analyzer module. The suggestion analyzer module cooperates with the user interface module and the decision tree to generate suggested reactions or messages for the user to send. The suggested reactions or messages are presented by the user interface module to the user. The user interface module also displays the original message, other information about the original message such as others' responses, and action buttons for sending, discarding or ignoring the suggested message.

The present disclosure is particularly advantageous because it provides a system and interface that automatically generate suggestions for personalized reactions or messages. There is no requirement for the user to set reminders or be proactive. The system automatically without user input analyzes information to which the user has access, and generates suggestions for personalized reactions to messages. The suggestion analyzer cooperates with the decision tree to learn the user's behavior and automatically adjust the suggested messages that are generated over time.

The present disclosure also describes a number of methods including a method for initializing a message suggestion system, a method for generating suggested messages or reactions, a method for sending suggested messages or reactions, and a method for updating a suggestion analyzer.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
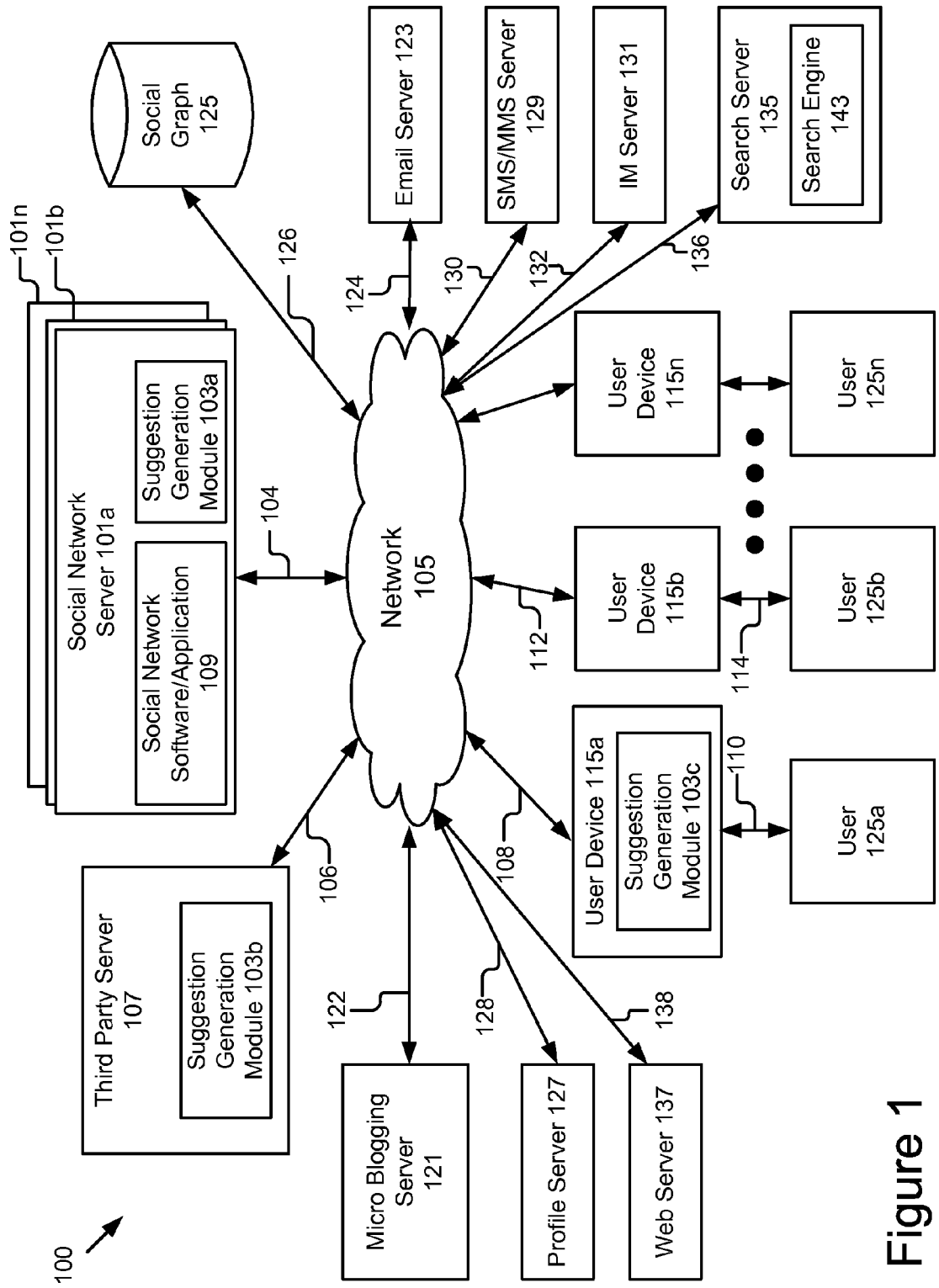
FIG. 1 is a high-level block diagram illustrating a functional view of a system for generating suggested messages or reactions according to one embodiment.

A system and methods for generating suggested personalized messages or reactions is described. In the description that follows the term "reaction" is intended to include both verbal reactions such as comments and replies as well as non-verbal reactions such inputting commands in response to received information. For example, user B reacted by clicking like/dislike button on video posted by user A or user B reacted by resharing the video posted by user A. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to user interfaces and particular hardware. However, the present invention applies to any type of computing device that can receive data and commands, and any devices providing services. Moreover, the present invention is described below primarily in the context of e-mail and use in social networks; however, those skilled the art will understand that the present invention applies to any type of communication and can be used for other applications beyond social networks such as but not limited to micro blogging, instant messaging, e-mail, etc.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System Overview

FIG. 1 illustrates a block diagram of a system 100 for generating suggestions for personalized reactions or messages according to one embodiment of the present disclosure. The illustrated system 100 for generating suggestions for personalized reactions or messages includes user devices 115a, 115b, 115n that are accessed by users 120a, 120b, 120n, a social network server 101 and a third party server 107. In the illustrated embodiment, these entities are communicatively coupled via a network 105. Although only three devices 115 are illustrated, persons of ordinary skill in the art will recognize that any numbers of user devices 115n are available to any number of users 120n. Moreover, those skilled in the art will recognize that while the present disclosure is described below primarily in the context of social networks 101 and e-mail 123, the present disclosure is applicable to any type of online communications.

The user devices 115a, 115b, 115n in FIG. 1 are used by way of example. While FIG. 1 illustrates three devices, the present disclosure applies to any system architecture having one or more user devices. Furthermore, while only one network 105 is coupled to the user devices, 115a, 115b, 115n, the social network server 101 and the third party server 107, in practice any number of networks 105 can be connected to the entities. Furthermore, while only one third party server 107 is shown, the system 100 could include one or more third party servers 107.

In one embodiment, the suggestion generation module 103a is operable on the social network server 101a, which is coupled to the network 105 via signal line 104. The social network server 101a also includes a social network software/application 109. Although only one social network server 101a is shown, persons of ordinary skill in the art will recognize that multiple servers may be present. A social network is any type of social structure where the users are connected by a common feature, for example, Orkut. The common feature includes relationships/connections, e.g., friendship, family, work, an interest, etc. The common features are provided by one or more social networking systems, such as those included in the system 100, including explicitly-defined relationships and relationships implied by social connections with other online users, where the relationships form a social graph. In some examples, the social graph 125 can reflect a mapping of these users and how they are related. Furthermore, it should be understood that social network server 101a and social network software/application 109 are representative of one social network and that there are multiple social networks 101b ... 101n coupled to the network 105, each having its own server, application and social graph. For example, a first social network is more directed to business networking, a second more directed to or centered on academics, a third is more directed to local business, a fourth directed to dating and others of general interest or a specific focus.

In another embodiment, the suggestion generation module 103b is stored on a third party server 107, which is connected to the network 105 via signal line 106. In yet another embodiment, the suggestion generation module 103c is stored on a user device 115a, which is connected to the network 105 via signal line 108. The user 120a interacts with the user device 115a via signal line 110. Similarly, the user device 115b is coupled to the network 105 via signal line 112 and the user 120b interacts with the user device 115b via signal line 114. Persons of ordinary skill in the art will recognize that the suggestion generation module 103 can be stored in any combination on the devices and servers, or in only one of the devices or servers.

The network 105 is a conventional type, wired or wireless, and may have any number of configurations such as a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or includes portions of a telecommunications network for sending data in a variety of different communication protocols. In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc.

The suggestion generation module 103 interacts with other systems 107, 115a-n, 121, 123, 125, 127, 129, 131, and 135 to create suggested personalized messages or reactions. The suggestion generation module 103 also generates and presents user interfaces that allow the user to view the original message, related information about the original message, a suggested reaction or message to the original message and action buttons for processing the suggested message. In one embodiment, the suggestion generation module 103 receives data from a user via user devices 115. The suggestion generation module 103 interacts with the user devices 115 and the social network application 109 to present the suggested personalized reaction or message. In another embodiment, the suggestion generation module 103 also cooperates with the email server 123 to generate reactions or messages in response to e-mail messages. In another embodiment, the suggestion generation module 103 also receives data related to electronic communication from a Short Message Service (SMS)/Multimedia Messaging Service (MMS) server 129, an instant messaging (IM) server 131, a web server 137, and/or the third party server 107. In yet another embodiment, the suggestion generation module 103 also receives data related to electronic communication from the search server 135 that includes a search engine 143 and is coupled to the network 105 via signal line 136. In one embodiment, the search server 135 includes a search engine 143 for retrieving results that match search terms from the Internet. In one embodiment, the search engine 143 is powered by Google®. The social network application 109 in conjunction with the suggestion generation module 103 are used to manage and send data to and from the third party server 107 via signal line 106, the micro-blogging server 121 via signal line 122, the profile server 127 via signal line 128, the user devices 115 via signal lines 108 and 112, the e-mail server 123 via signal line 124, the social graph 125 via signal line 126, the SMS/MMS server 129 via signal line 130, the IM server 131 via signal line 132 and the web server 137 via signal line 138.

In one embodiment, the social network server 101, the third party server 107, the micro-blogging server 121, the e-mail server 123, the profile server 127, the SMS/MMS server 129, the IM server 131, the search server 135 and web server 137 are hardware servers including a processor, memory, and network communication capabilities.

Suggestion Generation Module 103

Figure 2:
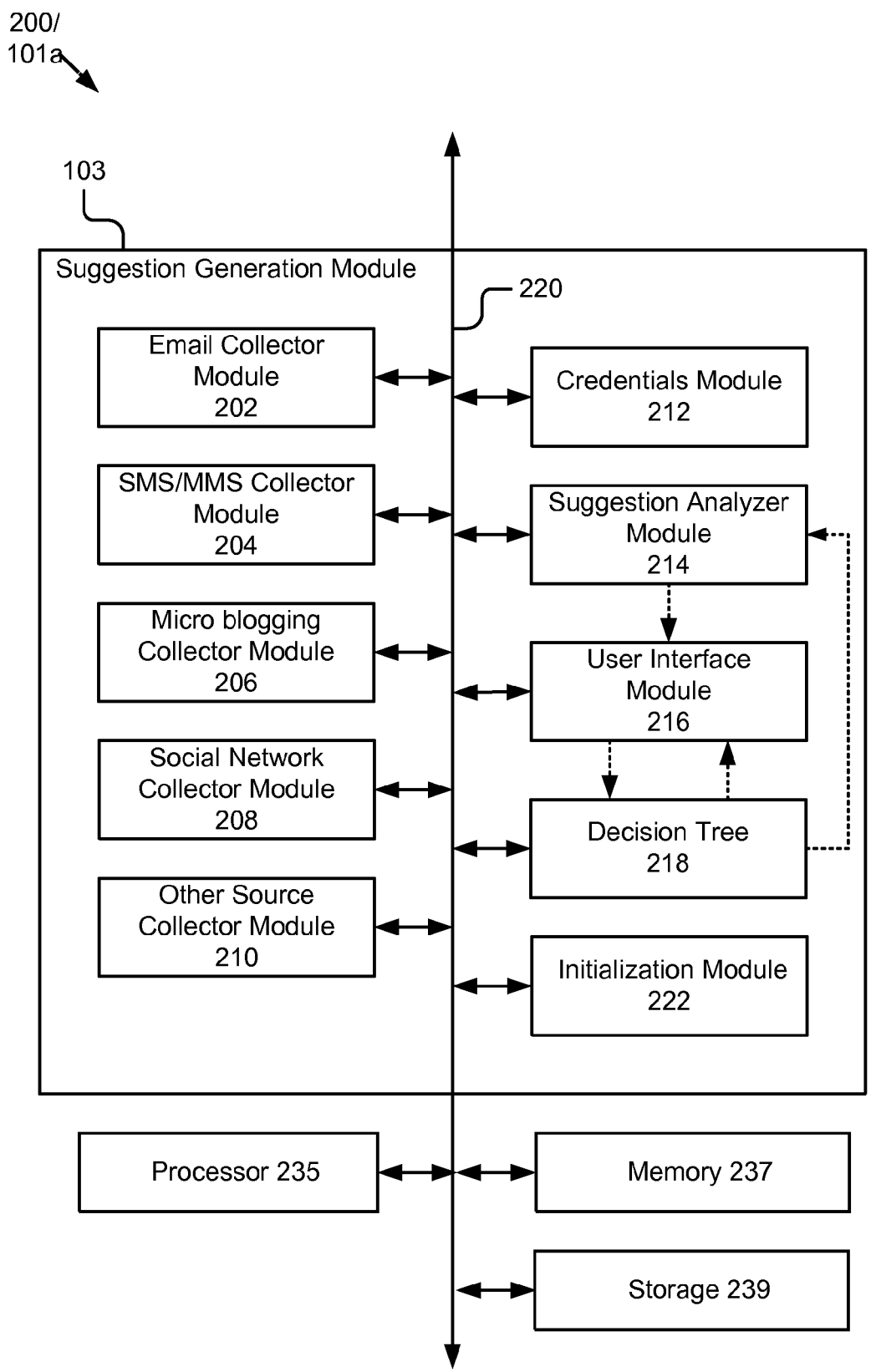
FIG. 2 is a high-level block diagram illustrating a suggestion generation module according to one embodiment.

Referring now to FIG. 2, the suggestion generation module 103 is shown in more detail. FIG. 2 is a block diagram of a computing device 200 that includes the suggestion generation module 103, a memory 237 and a processor 235. In one embodiment, the computing 200 device is a social network server 101a. In another embodiment, the computing device 200 is a third party server 107. In yet another embodiment, the computing device 200 is a user device 115a.

The suggestion generation module 103 and its components are described in more detail below.

The processor 235 comprises an arithmetic logic unit, a microprocessor, a general purpose controller or some other processor array to perform computations and provide electronic display signals to a display device. The processor 235 is coupled to the bus 220 for communication with the other components via signal line 236. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. It will be obvious to one skilled in the art that other processors, operating systems, sensors, displays and physical configurations are possible.

The memory 237 stores instructions and/or data that may be executed by processor 235. The memory 237 is coupled to the bus 220 for communication with the other components. The instructions and/or data may comprise code for performing any and/or all of the techniques described herein. The memory 237 may be a dynamic random access memory (DRAM) device, a static random access memory (SRAM) device, flash memory or some other memory device known in the art. In one embodiment, the memory 237 also includes a non-volatile memory or similar permanent storage device and media such as a hard disk drive, a floppy disk drive, a CD-ROM device, a DVD-ROM device, a DVD-RAM device, a DVD-RW device, or some other mass storage device known in the art for storing information on a more permanent basis.

In one embodiment, storage 239 stores data and information used by the suggestion generation module 103. Such stored information includes information about users, information about messages, and other information retrieved by the collector modules 202, 204, 206, 208 and 210. In one embodiment, the storage 239 also stores data and other information utilized by the decision tree 218. Storage 239 stores data and instructions and comprises one or more devices including a hard disk drive, a floppy disk drive, a CD-ROM device, a DVD-ROM device, a DVD-RAM device, a DVD-RW device, a flash memory device, or some other mass storage device known in the art. The data storage 239 is coupled by the bus 220 for communication with the user interface module 216, the suggestion analyzer module 214, and the decision tree 218.

In one embodiment, the suggestion generation module 103 comprises an e-mail collector module 202, an SMS/MMS collector module 204, a micro-blogging collector module 206, a social network collector module 208, other source collector module 210, a credentials module 212, a suggestion analyzer module 214, a user interface module 216, a decision tree 218 and an initialization module 222. These modules 202-218, processor 235, the memory 237 and storage 239, are configured for communication with each other via bus 220. The bus 220 can be any type of conventional communication bus.

One or more of e-mail collector module 202, the SMS/MMS collector module 204, the micro-blogging collector module 206, the social network collector module 208, the other source collector module 210, the credentials module 212, the suggestion analyzer module 214, the user interface module 216, the decision tree 218 and the initialization module 222 is software including routines for generating personalized messages or reactions. In another embodiment, one or more of e-mail collector module 202, the SMS/MMS collector module 204, the micro-blogging collector module 206, the social network collector module 208, the other source collector module 210, the credentials module 212, the suggestion analyzer module 214, the user interface module 216, the decision tree 218 and the initialization module 222 store data that, when executed by the processor 235, causes the modules to perform the operations described below. In yet another embodiment, one or more of e-mail collector module 202, the SMS/MMS collector module 204, the micro-blogging collector module 206, the social network collector module 208, the other source collector module 210, the credentials module 212, the suggestion analyzer module 214, the user interface module 216, the decision tree 218 and the initialization module 222 are instructions executable by the processor 235 to provide the functionality described below with reference to FIGS. 4-8. In still another embodiment, one or more of e-mail collector module 202, the SMS/MMS collector module 204, the micro-blogging collector module 206, the social network collector module 208, the other source collector module 210, the credentials module 212, the suggestion analyzer module 214, the user interface module 216, the decision tree 218 and the initialization module 222 is stored in the memory 237 of the computing device 200 and is accessible and executable by the processor 235.

The e-mail collector module 202 is a module for interacting with e-mail systems coupled to the suggestion generation module 103 via the network 105. In one embodiment, the e-mail collector module 202 interacts with the e-mail server 123 to retrieve e-mail information such as messages that have been received and sent, the status of messages as to whether they read, unread, forward, replied to, etc. For example, the e-mail server 123 is an e-mail service such as Gmail offered by Google Inc. of Mountain View Calif. The e-mail collector module 202 interacts with the credentials module 212 to retrieve the user's login name and password as well as any other information necessary to access the e-mail server 123. The e-mail collector module 202 also stores information that has been retrieved in the storage 239. The e-mail collector module 202 is coupled for communication with other e-mail systems 123, the credentials module 212, and the storage 239. Those skilled in the art will recognize that even though the e-mail collector module 202 has been described above as connecting and extracting information from a single e-mail system, the e-mail collector module 202 may perform the same operation for a plurality of e-mail systems that are utilized by a particular user. For example, users often have several different e-mail accounts. In some embodiments, the e-mail collector module 202 connects and collects information from two or more of these several different e-mail accounts.

The SMS/MMS collector module 204 is a module for interacting with an SMS or an MMS system. In some embodiments, the SMS/MMS collector module 204 is also used to interact with an instant messaging system (not shown). In one embodiment, the SMS/MMS collector module 204 is coupled by network 105 for communication and interaction with the SMS/MMS server 129. The SMS/MMS collector module 204 is similar to the e-mail collector module 204 except that it collects information related to SMS and/or MMS messages. The SMS/MMS collector module 204 interacts with the credentials module 212 to retrieve the user's login and password as well as other information necessary to access the SMS/MMS server 129. The SMS/MMS collector module 204 retrieves and collects information about SMS or MMS messages sent or and received by the user. The SMS/MMS collector module 204 also collects status information about the messages such as whether they are read or unread, whether they a response was sent, the time difference between receipt and response, etc. The SMS/MMS collector module 204 also stores the information it collects in the storage 239. The SMS/MMS collector module 204 is coupled by the bus 220 to the credentials module 212 and the storage 239.

The micro-blogging collector module 206 is a module for interacting with a micro-blogging system. In some embodiments, the micro-blogging collector module 206 is coupled by network 105 for communication and interaction with the micro-blogging server 121. The micro-blogging collector module 206 is similar to the e-mail collector module 204 except that it collects information related to micro-blog messages. The micro-blogging collector module 206 interacts with the credentials module 212 to retrieve the user's login and password as well as other information necessary to access the micro-blogging server 121. The micro-blogging collector module 206 retrieves and collects information about micro blogs that the user follows, micro-blog messages sent, micro blogging messages received, and other uses of the micro-blogging server by the user. The micro-blogging collector module 206 also collects status information from the micro-blogging server 121. The micro-blogging collector module 206 stores the information it collects in the storage 239. The micro-blogging collector module 206 is coupled by the bus 220 to the credentials module 212 and the storage 239.

The social network collector module 208 is a module for interacting with one or more social network systems. In some embodiments, the social network collector module 208 is coupled by network 105 for communication and interaction with the social network server 101, social network application 109 and social graph 125. The social network collector module 208 is similar to the e-mail collector module 204 except that it collects information related to a user's interaction and use of a social network. The social network collector module 208 interacts with the credentials module 212 to retrieve the user's login and password as well as other information necessary to access the social network application 109 and social graph 125. The social network collector module 208 retrieves and collects information about messages sent, messages received, information posted, posted information reviewed, change in status of friends, the addition of connections, removal of connections, and any other activity that can be undertaken by the user on the social network. The social network collector module 208 also collects information from other individuals that are important or links to the user. In one embodiment, the application interface (API) of the social network is used by the social network collector module 208 extracts information. Thus, those skilled in the will recognize that the social network collector module 208 can retrieve any information related to the user from the social network. The social network collector module 208 stores the information it collects in the storage 239. The social network collector module 208 is coupled by the bus 220 to the credentials module 212 and the storage 239.

The other source collector module 210 is a module for interacting with and extracting information from any other electronic communication system. In some embodiments, the other source collection module 201 is coupled to the third party server 107, the Web server 137, or the profile server 127 to retrieve information. The other source collector module 210 collects information related to the user's interaction with that other system. The other source collector module 210 stores the information collected in the storage 239. The other source collector module 210 also interacts with the credentials module 212 to retrieve the information necessary to access the other systems 107, 127 and 137. The other source collector module 210 is coupled by the bus 220 for communication with the pencils module 212, the storage 239, and the other systems via network 105. Those skilled in the art will recognize that all of the above collector modules 202-210 allow the suggestion generation module 103 to access and retrieve any and all information to which the user has access. For example, the social network collector module 208, the suggestion generation module 103 can access the user's social graph, posts sent and received, and any other data public or private that is available to the user.

The credentials module 212 is software and routines for receiving, storing, and providing credentials related to a user's access of other systems. In some embodiments, the credentials module 212 stores credential information (login name, password, and other credentials) related to access of various different systems. In one embodiment, the credentials module 212 cooperates with the initialization module 222 to receive input from the user including: 1) system information (e.g., Gmail Web address or social network web address); 2) login name; 3) passwords; and 4) other credential information required to access the account. In another embodiment, the credentials module 212 cooperates with one or more of the e-mail collector module 202, the SMS/MMS collector module 204, the micro-blogging collector module 206, the social network collector module 208 and the other source collector module 210 to provide credential information that allows these other modules 202, 204, 206, 208 and 210 to access their respective systems. In another embodiment, the credentials module 212 receives, and encrypts the credential information before storing it in a predefined data structure in the storage 239. Only the credentials module 212 knows the structure in storage and encryption of the data and can access the data from the storage 239 while other modules cannot.

The suggestion analyzer module 214 is software and routines for generating a personalized message or reaction for a user. The suggestion analyzer module 214 is coupled to receive, process and analyze information collected by the collector modules 202, 204, 206, 208 and 210. In one embodiment, the suggestion analyzer module 214 receives the information directly from the collector modules 202, 204, 206, 208 and 210. In another embodiment, these collector modules 202, 204, 206, 208 and 210 store the collected information in storage 239, and the suggestion analyzer module 214 retrieves the information from storage 239. As shown in FIG. 2, the suggestion analyzer module 214 outputs suggested messages and other information (as represented by the dash line) to the user interface module 216 for presentation to the user. The operation of the suggestion analyzer module 214 will be described in more detail below with reference to FIGS. 4-8. The suggestion analyzer module 214 advantageously processes the information and determines which messages are most important to the user, which messages have the highest priority, and which messages are most worthy of reaction. In one embodiment, the suggestion analyzer module 214 receives input from the decision tree 218 in making this determination. In this manner the suggestion analyzer module 214 is adaptive to the feedback from the user and over time can become automatic without need for the user to approve or reject suggested messages. Moreover, the suggestion analyzer module 214 is as able to adapt the content and tone of messages according to feedback from the user. The suggestion analyzer module 214 also generates a suggested reaction or message based on the content of the original message, reactions to the original message and other information from the other systems. In this context, the other systems can include one or more of an e-mail system, a SMS/MMS system, a micro-blogging system, a social network or other electronic communication systems. The suggestion analyzer module 214 is coupled by the bus 220 for communication with the collector modules 202, 204, 206, 208 and 210, the user interface module 216, the decision tree 218, and the storage 239.

The user interface module 216 allows the suggestion generation module 103 to interact with the user. For example, the user interface module 216 generates and presents graphic user interfaces (GUI) that allow interaction with the user such as via user device 115.

The user interface module 216 is coupled by the bus 220 to the network 105 and to the user devices 115*a*-115*n*. Those skilled in the art will recognize that the user interface module 216 can also be coupled to any other input/output devices associated with any of the other components in FIG. 1. The user interface module 216 generates and sends interfaces as will be described in more detail below with reference to FIG. 8 for reviewing suggested personalized reactions or messages, and sending suggested personalized messages. The user interface module 216 also receives input from the user related to the action to be taken with regard to a particular suggested personalized message or reaction. The user interface module 216 is also coupled to provide information related to the suggested personalized message or reactions such as the original message and other information about the original message. The user interface module 216 is coupled by the bus 220 to the suggestion analyzer module 214, the decision tree 218, the initialization module 222 and the network 105.

The decision tree 218 is a module or routines that implement a decision support tool that uses a tree-like graphical model for making decisions. In one embodiment, the decision tree 218 is an artificial intelligence-based decision tree. The decision tree 218 is coupled to the user interface module 216 to receive information from the user regarding suggested messages and whether they are sent, modified and sent, ignored or discarded. A sent message can be sent exactly as suggested by the suggestion analyzer module 214 or modified and then sent. In the former case, the decision tree 218 receives positive feedback and adjusts the tree as appropriate. In the latter case, the decision tree 218 still receives positive feedback, but not as strong since the user modified the message, and adjusts the tree as appropriate. The content of future messages may also be changed based on the modifications made by the user to the suggested message. If the user input an ignore message response, the decision tree 218 is modified since the feedback indicated that the user does not care about this topic and messages of this type. The decision tree 218 is adjusted so that these messages have a lower priority or are not even generated going forward. Finally, the user can discard or reject a message. In one embodiment, no feedback is provided for such responses and discarding messages has no affect on the decision tree 218. In another embodiment, the discard selection indicates that the message is inaccurate or that the user does not want reaction to the message, and it is considered negative feedback with the decision tree 218 being adjusted to filter out these type of anomalies.

The decision tree 218 also receives information about how that suggested message was generated and information associated with the suggested message. The decision tree 218 uses this information to adjust the algorithm, nodes, weights and outcomes. The decision tree 218 is coupled by bus 220 to send and receive information from the user interface module 216 and the suggestion analyzer module 214.

The initialization module 222 is software or routines for initializing the suggestion generation module 103. In particular, the initialization module 222 cooperates with the user interface module 216 to acquire information from the user about online communication systems that are utilized by the user. For example, if a particular user commonly accesses e-mail and a particular social network, that information is identified and retrieved by the initialization module 222. The operation of the initialization module 222 will be described in more detail below with reference to FIG. 4. The initialization module 222 collects information about the user's accounts with other online communication systems. The initialization module 222 sends such information to the credentials module 212 for storage and future use. The initialization module 222 is coupled by the bus 220 to the user interface module 216 and the credentials module 212.

Figure 3:
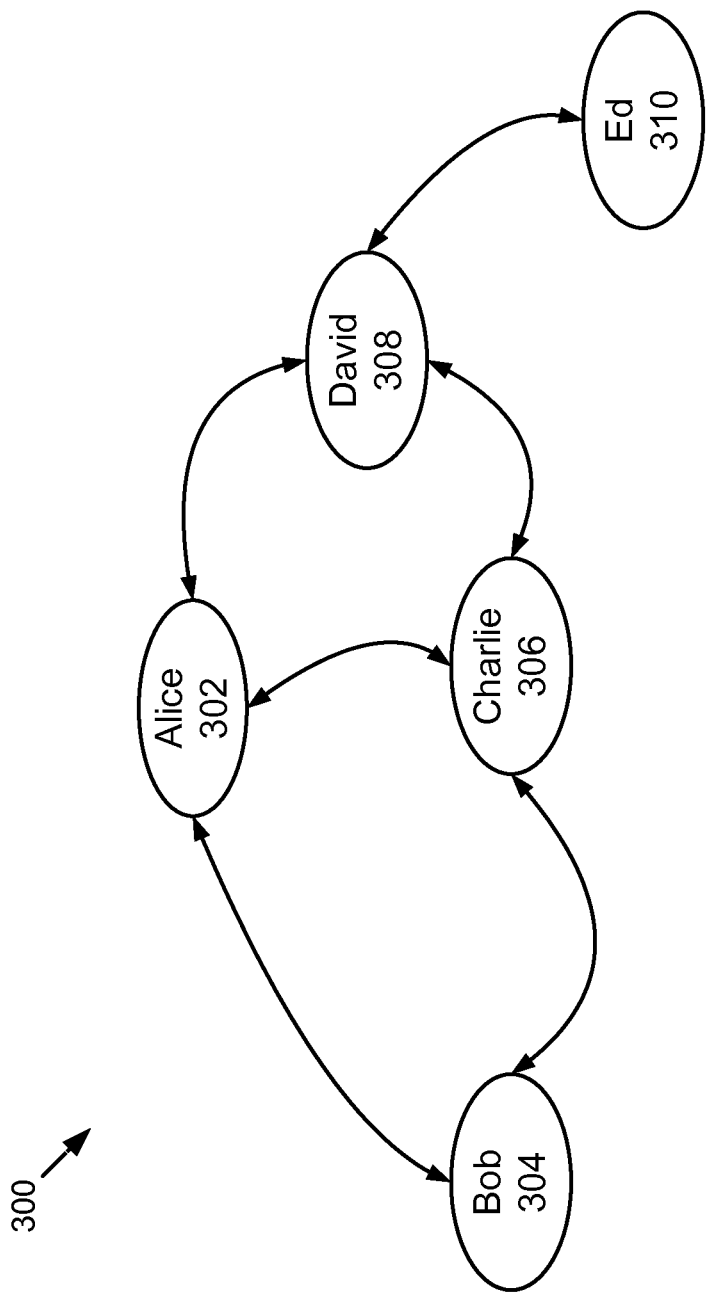
FIG. 3 is a state diagram illustrating an example social network and messaging paths utilized by the suggestion generation module according to one embodiment.

Referring now to FIG. 3, a state diagram 300 illustrating an example social network and messaging paths utilized by the suggestion generation module 103 according to one embodiment is shown. In this example, the social graph of Alice 302 includes direct relationships with Bob 304 and Charlie 306. Alice also has a direct relationship with David 308 who in turn has a direct relationship with Ed 310. Charlie 306 also has a direct relationship with Bob 304 and David 308. The state diagram 300 will be used to show some example cases in which the suggestion generation module 103 of the present disclosure is particularly advantageous. If Alice 302 is using the suggestion generation module 103 to act on her behalf, the suggestion generation module 103 generates various personalized response messages or reactions under certain example conditions as follows. The suggestion generation module 103 processes and analyzes data from Alice's social graph as well as her e-mail account. In a first example, assume a friend, Bob 304, in the group or circle of Alice 302 posts a message at location which is either public or accessible to Alice 302 and at least a certain predefined number of friends posts a reaction (for example, all the reactions might be congratulating Bob 304 or some of these might even carry a negative tone which can imply a controversial discussion). The suggestion generation module 103 informs Alice 302 to post an appropriate message to Bob 304 and also presents good suggestions based on the earlier messages to Bob 304. In a second example, a lot of (common) friends of Charlie 306 post messages for Charlie 306 with similar implications (e.g., messages saying "Happy Birthday!"). The suggestion generation module 103 informs Alice 302 to make an adequate post and also presents good suggestions (based on the earlier messages sent to Charlie 306). In this manner, the suggestion generation module 103 automatically handles various important dates in Alice's social circle without Alice 302 having to maintain a record of the date or pre-record any action or reminder. In a third example, a friend, David 308, sends Alice 3028 public or private message of a particular but regularly encountered message type (e.g., "how are you doing?" a common way to greet someone in the United States). The suggestion generation module 103 suggest a good set of reactions to David 308, for example, based on the professional profile of David 308 from the social network 109 indicating that David 308 has changed employers. The suggestion generation module 103 generates a reply message such as "Hey David, I am fine, You were in ABC corp. for 3 years and you recently moved to XYZ corp., how do you feel about the difference, enjoying your new workplace?)" The content of this suggestion are based on 1) prior conversations between Alice and David, 2) previous messages sent by Alice to other friends and 3) messages (sent by other connections in Alice's friend circle to David) which are either publicly or privately accessible to Alice, or some combination of these. Thus, the suggestion generation module 103 generates messages that are personalized based upon both the sender and recipient using information that is accessible (public or private) to the sender. In other embodiments, the suggestion generation module 103 is also modified so that the reply messages are adapted to cultures and customs of the recipient. As will described in more detail below with reference to FIG. 8, instead of sending messages automatically, the suggestion generation module 103 shows messages to Alice 302 (for approval), and the approval interface can be a dedicated web UI or it could be as simple as "reply to this email and this reply will be sent." In other embodiment, the suggestion analyzer module 214 includes an option for posting certain categories of messages to certain types of websites an automatic fashion without requiring user approval. For example, after the decision tree 218 has been trained for a particular user such that the inaccurate messages or reactions have largely been, this automatic sending feature may be employed.

Methods

Referring now to FIGS. 4-7, the methods of the present disclosure will be described.

Figure 4:
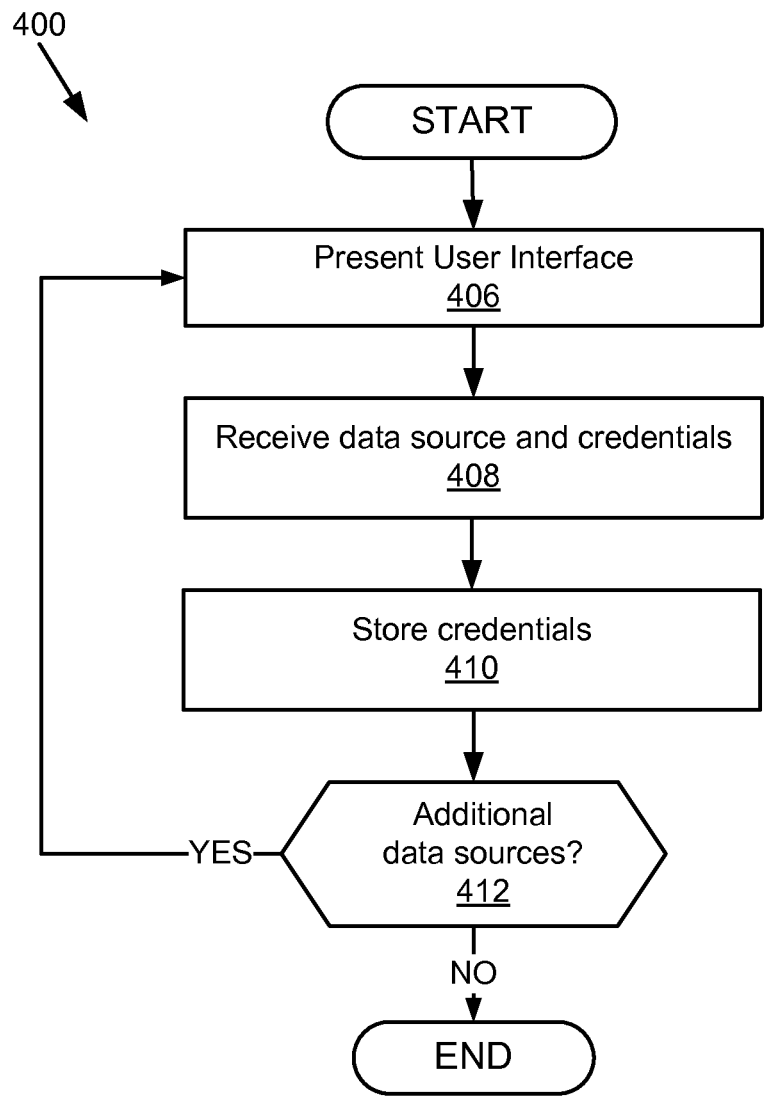
FIG. 4 is a flowchart of a method for initializing a suggestion generation system according to one embodiment.

Referring now to FIG. 4, a method for initializing a suggestion generation module 103 according to one embodiment will be described. The method begins by presenting 406 a user interface for inputting information about online communications that are employed by the user. In one embodiment, a user interface is presented that allows the user to input their credentials for accessing e-mail, a social network, SMS/MMS messaging systems, instant messaging systems, Web servers, micro blogging systems, profile systems, or other third party systems. For example, the user interface may include a plurality of fields in which the user can input: 1) an address for accessing a system; 2) a login or user ID; 3) a password; and 4) any other credential information necessary to gain access to the system. The user then inputs the data source and credentials using the user interface (and the user device 115, for example) and that information is received 408 by the suggestion generation module 103. Next the method stores 410 the credentials for later use by the suggestion generation module 103. In one embodiment, the information is stored by the initialization module 222 in the credential module 212. In another embodiment, the information is stored by the initialization module 222c in the data storage 239 in a unique data format and encrypted such that only the credentials module 212 can read and access the information. The method continues by determining 412 whether the user has additional data sources that are to be used to produce personalized messages or reactions. If not, the method is complete and ends. However, if there are additional data sources that the user wants to utilize to generate personalized messages or reactions, the method returns to step 406 and repeats steps 406-412 for each additional data source. Those skilled in the art will recognize that the present invention requires only a single source to generate personalized suggested messages or reactions. For example, the suggestion generation module 103 may only include the e-mail collector module 202 or only the social network cluster module 208 and use only one of these sources in generating the personalized reactions or messages. However, the present invention is also able to utilize a plurality of data sources in generating personalized reactions or messages. Further, when multiple data sources are utilize, the personalized reactions and messages can be customized to be more accurate and appropriate for the context in which the user is root client were sending the message. In either case, each data source to be utilized must be initialized by performing step 405-410 for each data source.

Figure 5:
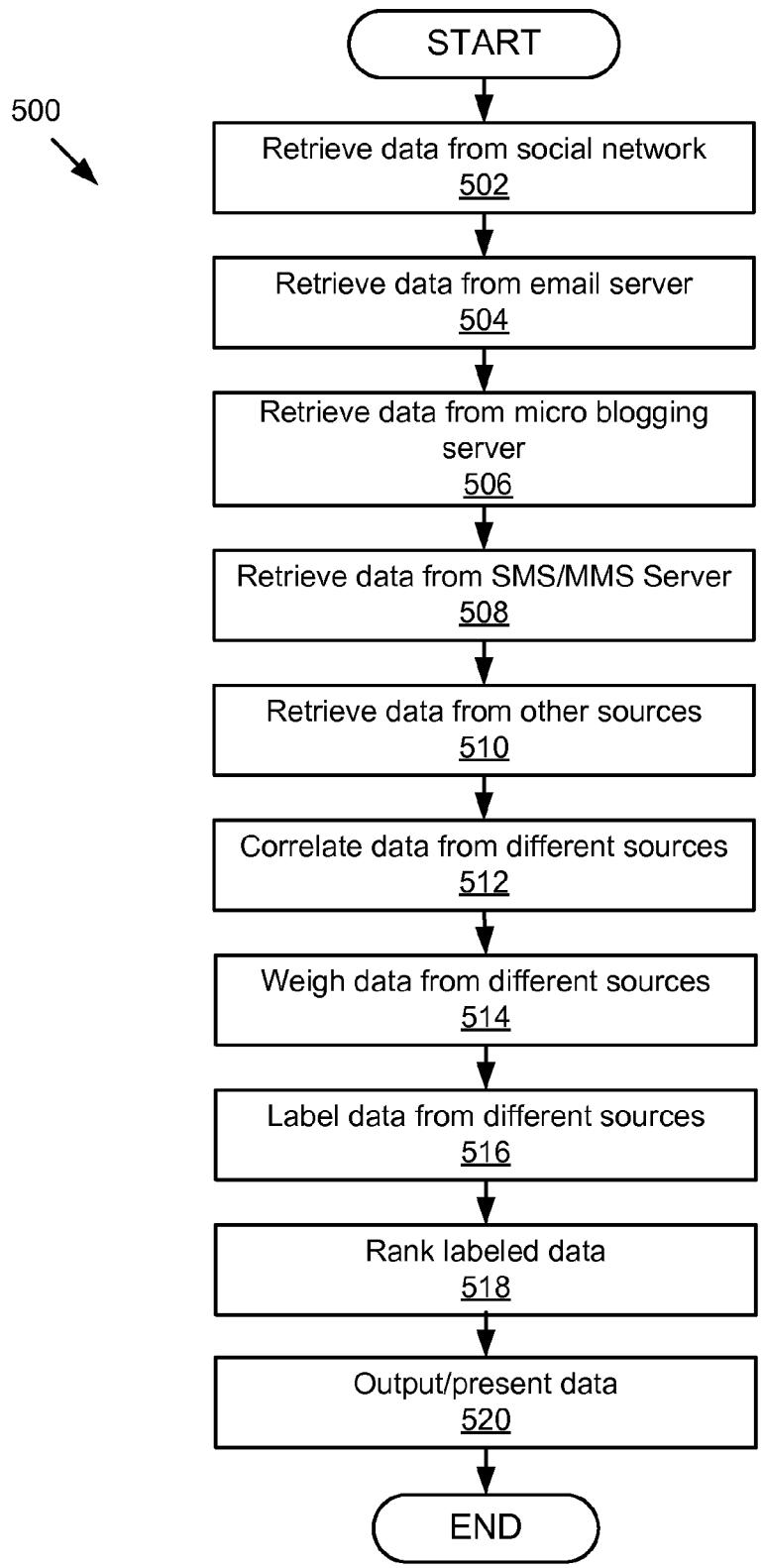
FIG. 5 is a flowchart of a method for processing collected information to generate suggested messages or reactions according to one embodiment.

Referring now to FIG. 5, a method 500 for processing collected information to generate suggested messages or reactions according to one embodiment will be described. The method 500 begins collecting/retrieving data from various sources. In this embodiment, the method begins by retrieving 502 data from the social network 109. Then, the method retrieves 504 data from the e-mail server 129. Next, the method retrieves 506 data from the micro-blogging server 121. Then the method retrieves 508 data from the SMS/MMS server 129. Finally, the method retrieves 510 data from other data sources 107, 127, 131, 135 and 137. In one embodiment, this information is retrieved by the collectors 202-210 described above with reference to FIG. 2. Those skilled in the art will recognize that steps 502-510 can be performed in any order. Furthermore, one or more of steps 502-510 are optional and the method of the present disclosure is operable so long as information is retrieved from one of these data sources.

The method continues by correlating 512 the data from different sources. For example, if a user receives an e-mail about a particular event, activity, interest, etc., from a particular individual, and that individual is also connected to the user in the user's social graph a correlation between the data from disparate resources is created. If there is only a single source of data, this correlation step is not necessary and may be omitted. However, if the data from multiple sources can be correlated and used to identify increased specificity about the topic or parties involved, the messages can be personalized to a greater extent. In other words, the date from different profiles is related or correlated based upon name and email. Next, the method weighs 514 the data from the different sources. In other words, different events, activities and interests are rated with different weights based upon the user's interest in these topics and the number of other people who have reacted to the messages. For example, if the user frequently "ignores" messages containing the word "baseball" the system will learn over time to reduce the priority of those messages and will eventually stop showing those messages altogether (even if all other connections of user love sending messages containing word "baseball." Similarly, if user regularly reacts to messages containing "football," the decision tree 218 will increase its priority over time. Also, if the user shows similar amount of interest in "cooking" as well as "football," the decision tree 218 will give a higher priority based on number of reactions received on the message, since the greater the number of reactions to the message, the more important it is for the user to react to it. Next, the data from different sources is labeled or categorize 516 into different categories so that suggested the personalized reactions to messages can be presented to the user in groups or ordered according to the categories. For example, individuals may be categorized by based on categories such as personal, business, family, friends based on the information collected from the sources. In one embodiment, labels are created based upon phrase matching in the original message and its reactions. If there is a phrase match, then the existing label is assigned, if not, a new label is created and assigned. Over time a library of words or labels are created. For example, phases like birthday, anniversary, congratulations, etc. are likely to appear in messages and will generate a set of labels. Next, based upon the weight and the label, the messages are ranked 518 in order from the most important or interesting to the least important or least interesting. Finally the method completes by generating and presenting or outputting 520 suggested personalized reactions or messages to the user. For example, this can be done using the user interface as shown in FIG. 8 as will be described in more detail below.

Figure 6:
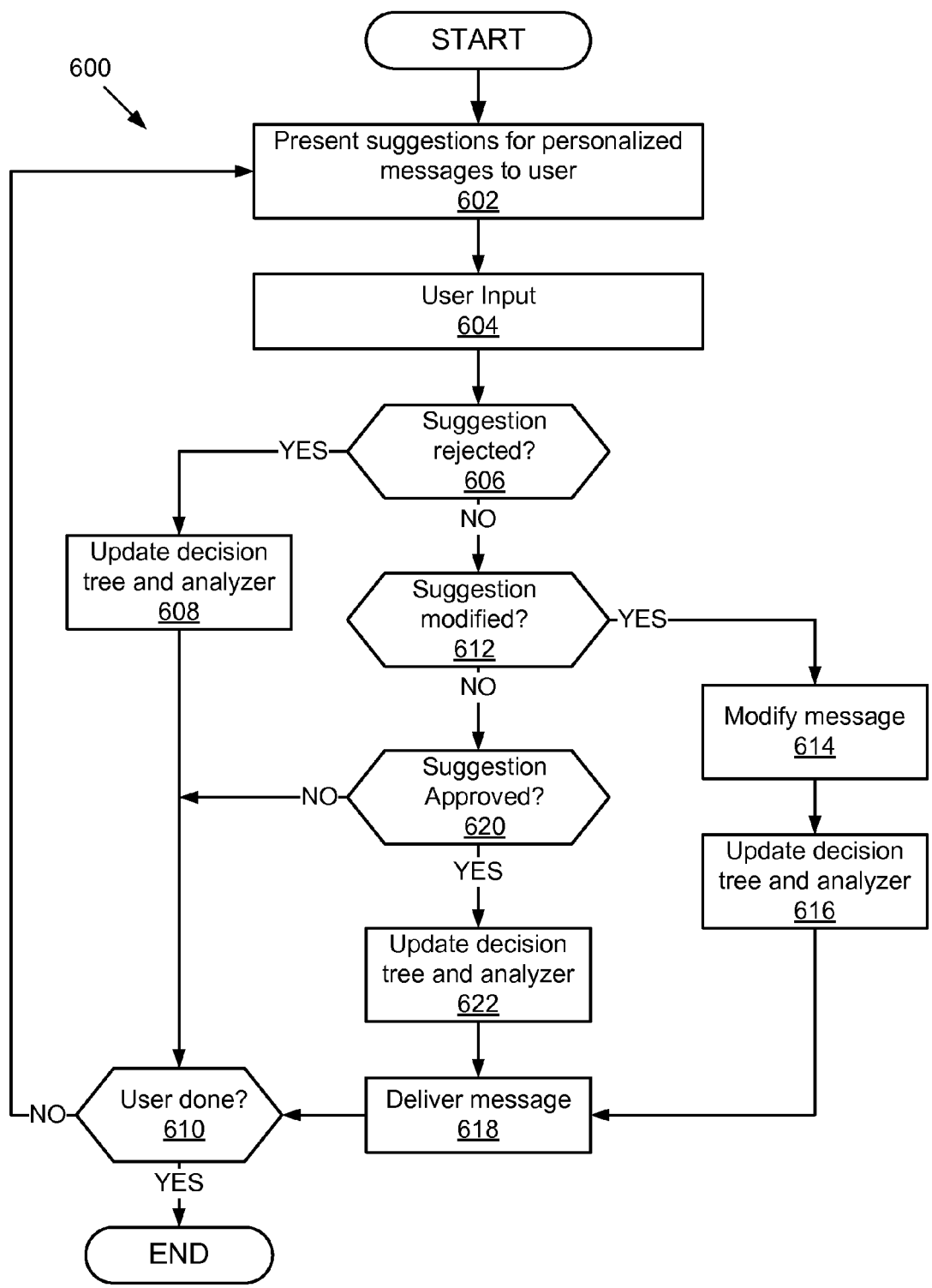
FIG. 6 is a flowchart of a method for presenting suggested messages or reactions according to one embodiment.

Referring now to FIG. 6, a method 600 for presenting suggested personalized messages or reactions according to one embodiment will be described. The method begins by presenting 602 suggestions for personalized messages to the user.

Figure 8:
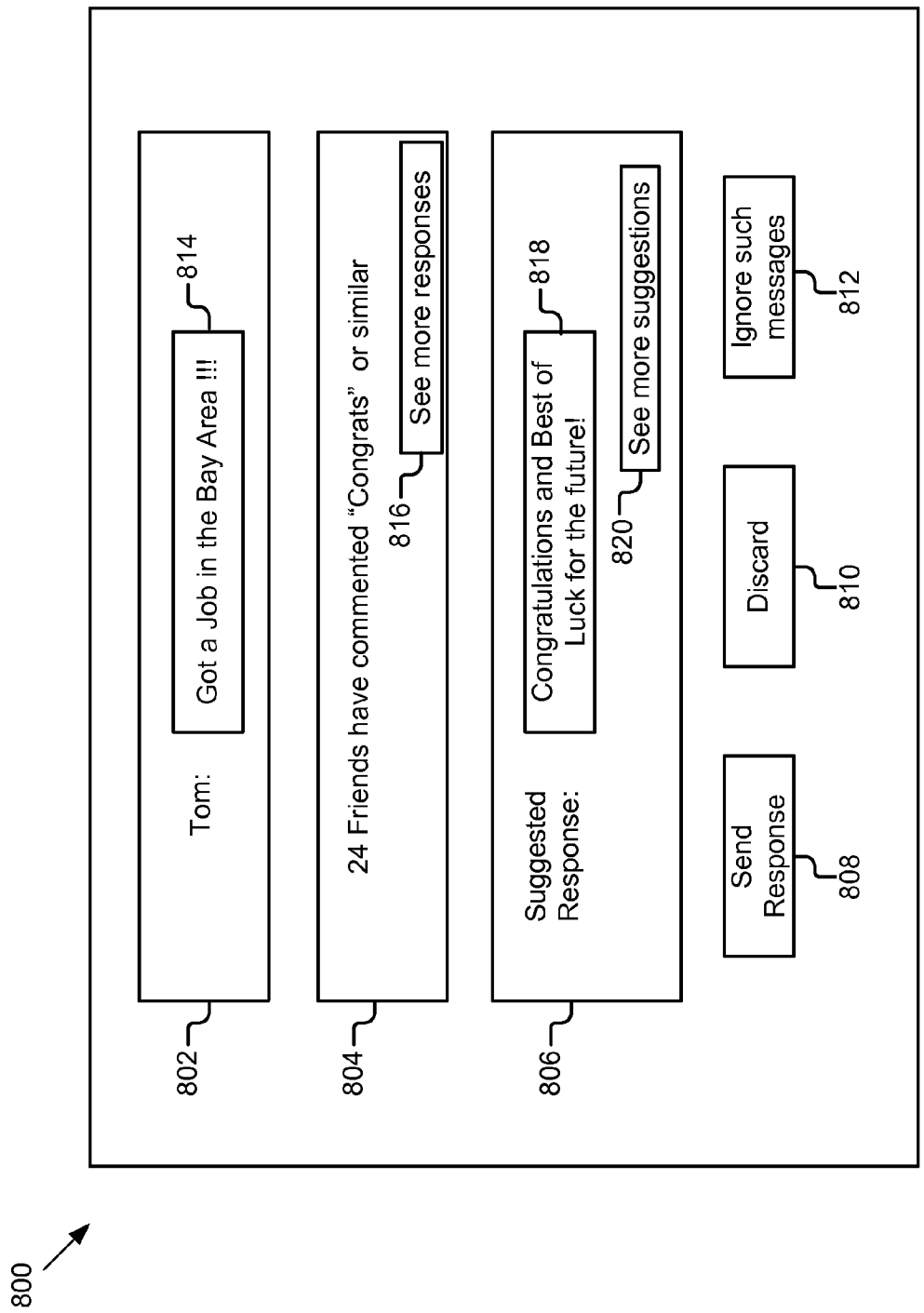
FIG. 8 is a graphic representation of one embodiment of a user interface for presenting suggested messages or reactions according to one embodiment.

Referring now also to FIG. 8, a graphic representation of an example user interface 800 for presenting suggestions for personalized messages is shown. The user interface 800 includes a window having a number of components including a message box 802 for displaying an original message, a context box 804 for providing information about the original message, a suggested message box 806 including a suggested message or reaction, and a plurality buttons 808, 810 and 812 allowing the user to input an action to be taken on the suggested reaction or message.

In one embodiment, the message box 802 includes a label specifying the author of the message and a field 814 that includes the original text of the message. Those skilled in the art will recognize that the message could be a post on a social network, an e-mail message or any other type of electronic communication. The field 814 is used to store and present the body or content of the electronic communication. In this example, the field 814 includes the message "Got a job in the Bay Area!!!"

In one embodiment, the context box 804 includes information related to the original message. For example, the context box 804 includes a sample response and information about related responses. In this example, the context box 804 includes an indication that 24 friends have commented and that the comments or messages have included "Congrats". In this embodiment, the context box 804 also includes a selectable button 816 that allows the context box 804 to be expanded to display additional responses to the original message. If the button 816 is selected, the responses of other members in the group/connection/circle/recipients are displayed. It might be possible that another friend might have posted a similar message but have received only one reaction. In that case, the decision tree 218 will not give the latter message as high priority as the one which received reaction from 24 users and might not even present the latter message to user.

In one embodiment, the suggested message box 806 includes a label, a field 818 including a suggested message and a selectable button 820 for displaying additional suggested messages. Proximate the field 818, a label of "Suggested Response:" is positioned to indicate to the user that the content in field 818 is the suggested response. In this example, the field 818 includes a reply message of "Congratulations and Best of Luck for the future!" In another embodiment, the field 818 is editable and the user can input their own message or revise the existing messages. In such a case, those edits will be sent to the decision tree 218 as feedback as will be described in more detail below. Below the suggested response field 818 a selectable button 820 is positioned. The button 820 is labeled "See more suggestions" and when selected the suggested message box 806 is modified such that the field 818 displays another different suggested message. In one embodiment, as the user repeatedly selects the button 820, new suggested responses are displayed in the field 818 and the user interface 800 presents additional suggested responses in various orders such as random, ranked by relevance, ranked by importance, ranked by match to context, etc. In another embodiment, in response to selection of the button 820, field 818 becomes a drop-down menu of suggested responses from which the user may select. In another embodiment, more suggestions will be populated over the period of time based on the feedback signals received from the user.

In one embodiment, below the suggested message box 806 are the plurality buttons 808, 810 and 812. A first button 808 when selected by the user causes the message in the field 818 of the suggested response box 806 to be sent to the author of the original message and close the user interface 800. As used in this context, sent means to send a message or applied based upon the format of the message shown in the message box 802. A second button 810 discards the message in the field 818 of the suggested response box 806 and closes the user interface 800. In one embodiment, selection of the second button 810 does not return a feedback signal to the decision tree 218. A third button 812 discards the message in the field 818 of the selected response box 806, closes the user interface 800, and also updates the suggestion generation module 103 so that it does not present messages similar in type to the one in the suggested response box 806. As will be described in more detail below, selection of the first and third buttons 808 and 812 generates an update to the suggestion generation module 103 such that it becomes more accurate at generating suggestions over time.

Referring back to FIG. 6, the method continues to receive 604 user input. For example, the user must select one of the buttons 808, 810 and 812 indicating how to handle the suggested personalized message or reaction. Next, the method determines 606 whether the suggested response was rejected. In other words, the method determines whether the user selected the third or "ignore such messages" button 812. If so, the method updates 608 the decision tree 218 and the suggestion analyzer module 214. For example, the method provides the user input as feedback to the decision tree 218 and the suggestion analyzer module 214 so that such messages may be ranked lower in the future. After step 608, the method determines 610 whether the user is finished sending personalized suggested messages. If not, the method returns to step 602 to present the user interface 800. If not, the method is complete and ends.

If in step 606, the method determined that the suggestion was not rejected, the method continues to determine 612 whether the user has modified the suggested personalized message. In this case, the user has edited the suggested personalized response and then selected the send response button 808. If so, the method modifies 614 the message. Next, the method updates 616 the decision tree 218 and the suggestion analyzer module 214 that the user has edited the suggested response and decided to send the edited response. This feedback can be used by the decision tree 218 and the suggestion analyzer module 218 to improve the suggested responses provided later. And then the method continues to deliver the message 618 after which the method proceeds to step 610 as has been described above.

If in step 612, the method determined that the suggestion was not modified, the method continues to determine 620 whether the user has approved the suggested personalized message. If not, the method proceeds to step 610 as has been described above. It should be noted that in this case the user has selected the second or discard button 810. The message is not sent and also the decision tree 218 and suggestion analyzer module 214 are not updated. On the other hand, if the user has approved the suggested personalized message and select the send response button 808, the decision tree and suggestion analyzer module 214 are updated 622 after which the message is delivered 618. The method returns to step 610 to determine whether there are any additional suggested messages to be sent if so the method returns to step 602. If not the method is complete and ends.

Figure 7:
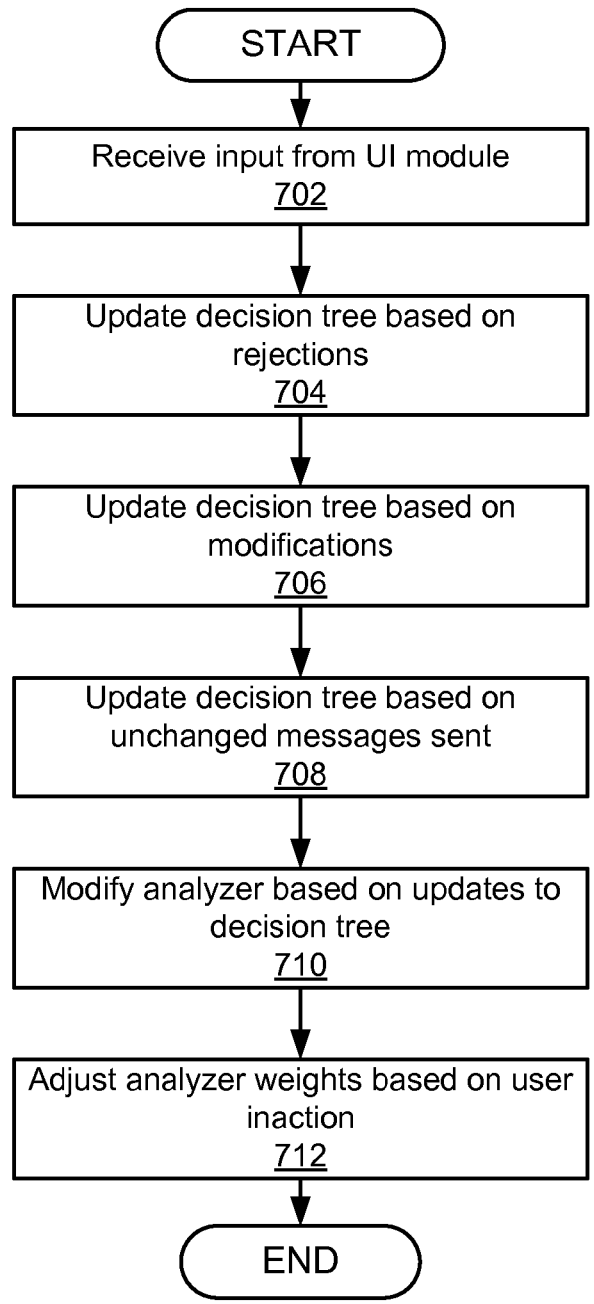
FIG. 7 is a flowchart of a method for modifying a decision tree of the suggestion generation module according to one embodiment.

Referring now to FIG. 7, a method 700 for modifying the decision tree 218 of the suggestion generation module 103 according to one embodiment will be described. The method 700 begins by receiving 702 input from the user interface module 216. As has been described above with reference to FIG. 6, the selection of different buttons 808 and 812 will provide feedback to the decision tree 218 and the suggestion analyzer module 214. Next, the method 700 updates 704 the decision tree 218 based upon the rejection of any suggested personalized reaction or message. Then the method updates 706 the decision tree 218 based upon modifications to sent messages. Next, the method updates 708 the decision tree 218 based upon unchanged suggested messages being sent. Then the method modifies 710 the suggestion analyzer module 214 based upon the updates to the decision tree 214. Finally, the method adjusts 712 the weights of the suggestion analyzer module 214 based upon user interaction, after which the method is complete and ends.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A method for generating a personalized reaction, the method comprising:
    collecting, using one or more computing devices, interaction items associated with a first user and accessible to the first user from one or more data sources, the one or more data sources including a social network, the interaction items including an online user post and a user reaction;
    processing, using one or more computing devices, the collected interaction items to produce one or more labels for the collected interaction items;
    ranking, using one or more computing devices, each collected interaction item based on the labels and based on the first user's prior reactions to other interaction items and the respective labels of the first user's prior reactions;
    determining that the online user post satisfies a threshold likelihood of being important or interesting to the first user; and
    automatically generating, using one or more computing devices, a suggested personalized reaction to the online user post on behalf of the first user, the suggested personalized reaction based on one or more labels associated with the online user post.

2. The method of claim 1 comprising initializing at least one of the one or more data sources.

3. The method of claim 2 wherein initializing the at least one of the one or more data sources includes collecting and storing a first user's credentials to access the data source being initialized.

4. The method of claim 1 wherein the one or more data sources include one or more of another social network, an e-mail system, a micro blogging system, a SMS system, a MMS system, an instant messaging system, and another online communication system.

5. The method of claim 1 wherein collecting information from the social network includes retrieving a social graph, messages posted and messages read.

6. The method of claim 1 wherein collecting information from the one or more data sources includes:
    collecting information from a plurality of data sources; and
    correlating the collected information.

7. The method of claim 1 further comprising:
    correlating the collected information;
    weighing the correlated collected information; and
    wherein a ranking is based upon a label and weight for each reaction; and
    wherein the generating step selects a reaction with a highest rank.

8. The method of claim 1 further comprising:
    presenting a suggested personalized reaction to the first user;
    receiving input from a user;
    determining whether the input is to send the suggested personalized reaction; and
    modifying a suggestion analyzer based on the received input when the input was to send the suggested personalized reaction.

9. The method of claim 8 wherein modifying the suggestion analyzer includes updating a decision tree based upon the suggested personalized reaction being sent.

10. The method of claim 1 further comprising:
    presenting a suggested personalized reaction to the first user;
    receiving input from a user;
    determining whether the input is to ignore the suggested personalized reaction; and
    modifying a suggestion analyzer when the input was to ignore the suggested personalized reaction.

11. The method of claim 1 further comprising:
    presenting a suggested personalized reaction to the first user;
    receiving input from a user;
    determining whether the input is to discard the suggested personalized reaction; and
    modifying a suggestion analyzer when the input was to discard the suggested personalized reaction.

12. An apparatus for generating a suggested personalized reaction, the apparatus comprising:
    one or more processors;
    a collector module, stored on a memory and executable by the one or more processors, for collecting interaction items accessible to a first user from an electronic communication system, the interaction items including an online user post and a user reaction, the collector module coupled to receive interaction items from the electronic communication system;
    a suggestion analyzer module for processing the collected interaction items to produce one or more labels for the collected interaction items, ranking each collected interaction item based on the labels and the first user's prior reactions to other interaction items and the respective labels of the first user's prior reactions, determining that the online user post satisfies a threshold likelihood of being important or interesting to the first user, and automatically generating a suggested personalized reaction to online user post on behalf of the first user, the suggested personalized reaction based on the one or more labels associated with online user post; and
    a user interface module for presenting the suggested personalized reaction and related information and for receiving input from the first user, the user interface module coupled to receive the suggested personalized reaction from the suggestion analyzer module, the user interface module configured to receive input from the first user.

13. The apparatus of claim 12 comprising a second collector module for collecting information of the first user from a second electronic communication system, wherein the electronic communication system is different from the second electronic communication system.

14. The apparatus of claim 12 wherein the electronic communication system is one from the group of a social network, an e-mail system, a micro blogging system, a SMS system, a MMS system, an instant messaging system, and another on-line communication system.

15. The apparatus of claim 12 wherein the collector module retrieves any information in the electronic communication system accessible to the first user whether the information is private or public.

16. The apparatus of claim 12 further comprising a credentials module for receiving, storing and providing credentials related to the first user's access of the electronic communication system, the credentials module coupled to receive input from the first user and coupled to provide information to the collector module.

17. The apparatus of claim 12 wherein the suggestion analyzer module correlates information collected by the collector module, weighs the correlated collected information and labels and ranks weighted information to generate the suggested personalized reaction.

18. The apparatus of claim 12 further comprising an initialization module for initializing a suggestion generation module with information that allows the collector module to access the electronic communication system, the initialization module coupled to receive input from the first user.

19. The apparatus of claim 12 further comprising a data storage for storing information collected by the collector module for use by the suggestion analyzer module, the data storage coupled to the collector module and the suggestion analyzer module.

20. The apparatus of claim 12 further comprising a decision tree for processing responses to suggested reaction and providing modification to weight to the suggestion analyzer module, the decision tree coupled to receive user responses from the user interface module and coupled to output modifications to the suggestion analyzer module.

21. The apparatus of claim 12 wherein the decision tree is an artificial intelligence-based decision tree.

* * * * *